United States Patent
Kato

(10) Patent No.: US 8,014,020 B2
(45) Date of Patent: *Sep. 6, 2011

(54) METADATA PRODUCING APPARATUS, IMAGE PROCESSING APPARATUS, METADATA PRODUCING METHOD AND PROGRAM

(75) Inventor: Hiroyuki Kato, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/890,563

(22) Filed: Sep. 24, 2010

(65) Prior Publication Data

US 2011/0013212 A1     Jan. 20, 2011

Related U.S. Application Data

(63) Continuation of application No. 11/277,018, filed on Mar. 20, 2006, now Pat. No. 7,826,086.

(51) Int. Cl.
*H04N 1/40* (2006.01)
(52) U.S. Cl. .................. 358/1.15; 358/448; 358/468
(58) Field of Classification Search .............. 358/1.9, 358/2.1, 448, 468, 1.15–1.16, 435–436
See application file for complete search history.

(56) References Cited

U.S. PATENT DOCUMENTS
5,058,055 A    10/1991    Takemoto et al.

FOREIGN PATENT DOCUMENTS
JP    2000-322050    11/2000
JP    2004-208317    7/2004

*Primary Examiner* — Thomas D Lee
*Assistant Examiner* — Stephen M Brinich
(74) *Attorney, Agent, or Firm* — Patterson & Sheridan, LLP

(57) ABSTRACT

There is provided technology which, when producing metadata for correlation with image data to which predetermined processing is to be administered and for characterizing that image data, can produce metadata that is more appropriate to the predetermined processing and can contribute to alleviating the work burden.

A metadata producing apparatus produces metadata for correlation with image data to which predetermined processing is to be administered and for characterizing that image data, the metadata producing apparatus including: a type information acquiring unit that acquires information relating to the type of metadata necessary to conduct the predetermined processing; and a metadata producing unit that produces, on the basis of the information acquired by the type information acquiring unit, metadata to be correlated with the image data to which the predetermined processing is to be administered.

16 Claims, 11 Drawing Sheets

FIG.4(A)

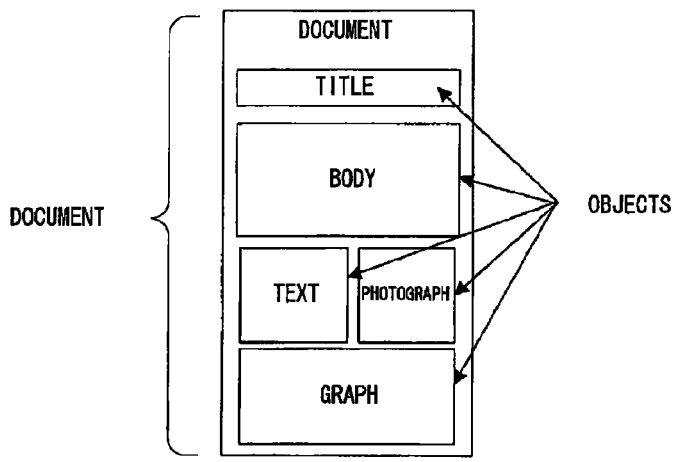

FIG.4(B)

|  | DOCUMENT LABEL (DEPENDING ON THE CASE, ACQUIRED DIFFERENTLY PER VERSION) | OBJECT LABEL (PAGES, IMAGE/TEXT AREAS) |
|---|---|---|
| METADATA UNDERSTOOD FROM CONTENTS | · NUMBER OF PAGES<br>· FORMAT, STYLE<br>· FILE SIZE | · COMPRESSION FORMAT, COLOR INFORMATION, RESOLUTION OF IMAGE<br>· COORDINATES RESULTING FROM LAYOUT ANALYSIS<br>· TEXT RESULTING FROM OCR |
| METADATA UNDERSTOOD FROM CONTEXT | · FILE NAME<br>· CREATOR<br>· PERSON RESPONSIBLE FOR WORK (SCANNING, PRINTING)<br>· GROUP TO WHICH PERSON RESPONSIBLE FOR WORK BELONGS<br>· SECURITY SETTINGS (ACCESS RIGHT, PASSWORD)<br>· LOCATION WHERE DOCUMENT IS STORED<br>· LOCATION WHERE DEVICE IS DISPOSED<br>· LOCATION WHERE DEVICE WAS WORKED (REMOTE WORK, DISTRIBUTED WORK)<br>· DATE AND TIME WORKED<br>· DATE AND TIME EDITED<br>· CORRESPONDING EVENTS (MEETINGS, BUT MEETINGS WHERE PRINTING AND THE LIKE OF DOCUMENT CAN BE DIRECTLY IDENTIFIED BY MEETING ROOM)<br>· MACRO, TEMPLATE OF WORK<br>· WORKSPACE OF WORK (OS, Box)<br>　PC WHERE THERE IS WORK REQUEST<br>　CONTENT OF EDITING WITH Box<br>· TRANSMISSION DESTINATION (ADDRESS, FAX NUMBER) | · PERSON RESPONSIBLE FOR WORK (ATTACHMENT OF FIGURES, TEXT EDITING)<br>· GROUP TO WHICH PERSON RESPONSIBLE FOR WORK BELONGS<br>· DATE AND TIME EDITED<br>· CORRESPONDING EVENTS<br>· WORKSPACE OF WORK<br>· FILE NAME OF COPY SOURCE |

METADATA PRODUCING APPARATUS, IMAGE PROCESSING APPARATUS, METADATA PRODUCING METHOD AND PROGRAM

CROSS-REFERENCE TO RELATED APPLICATIONS

The present application is a continuation of U.S. patent application Ser. No. 11/277,018, filed Mar. 20, 2006, the contents of which are herein incorporated by reference.

BACKGROUND OF THE INVENTION

1. Field of the Invention

The present invention relates to technology that produces metadata for being correlated with image data and for characterizing that image data.

2. Description of the Related Art

A multifunction peripheral (MFP) serving as an image processing apparatus includes a network scan function. With the network scan function, paper documents are scanned and images are made into electronic documents. Thereafter, the electronic documents are transferred to a server or the like connected to a network. A document management application or the like is installed in the server, and processing such as finishing, editing, and utilization (searching, printing) is administered by the document management application to the electronic documents transmitted from the MFP. Examples of format of the electronic documents include TIFF, JPEG and PDF.

Data for characterizing the image data produced by an MFP is called "metadata". For example, with respect to TIFF files, JPEG files and PDF files produced by Scan to File or the like, information such as the date and time when the files were scanned, the location at which the files were scanned, the person(s) who scanned the files, and the attributes, resolution and pixel number of the image data is metadata.

There are two types of locations where metadata is produced: (1) when the metadata is embedded in image data and is in the same file as the image data; and (2) when the metadata is saved in a file separate from an image data file.

The image data (TIFF, JPEG, PDF) and metadata produced by an MFP are used by applications outside the MFP. In this case, the content of the required metadata differs for each application. Conventionally, all of the metadata that can be acquired inside the MFP has been provided to an application, or just the metadata that is often used has been provided to an application.

However, because metadata that is unnecessary to an application is also included when all of the metadata is provided to that application, the metadata becomes redundant and its size becomes large, which is not preferable from the standpoint of consumed resources and the like. Further, when just the metadata that is often used is provided, there is the problem that, depending on the application to which the metadata is to be provided, sometimes the necessary metadata is not provided. In this case, it is necessary to change MFP programs such that the metadata necessary to an application can be provided to that application, which is burdensome.

There is a system that identifies images and their associated metadata for each receiver and determines profiles in regard to each receiver such that they include therein metadata access right information (e.g., see JP-A-2004-208317).

Further, there is a function called "job template" on MFPs. Job template is a function where combinations of functions that are often used can be registered in advance in a template and called up when necessary by depressing a button (e.g., see JP-A-2001-77959).

Plural parameter settings accompanying a job can be stored in advance in a job template. These include, for example, Scan-to-File scan parameters (resolution, paper size, exposure, color/black-and-white) and information relating to the destination to which a file is to be saved (path of destination to which a file is to be saved, format in which a file is to be saved). The advantage of this is that, as long as the job settings are the same, it becomes unnecessary to set each and every job parameter, so that plural items can be set at once simply by depressing a button one time and jobs with the same settings can be started.

SUMMARY OF THE INVENTION

The present invention has been made in view of the aforementioned point, and it is an object thereof to provide technology which, when producing metadata for correlation with image data to which predetermined processing is to be administered and for characterizing that image data, can produce metadata that is more appropriate to the predetermined processing and can contribute to alleviating the work burden.

In order to address this problem, a metadata producing apparatus pertaining to the present invention is a metadata producing apparatus that produces metadata for correlation with image data to which predetermined processing is to be administered and for characterizing that image data, the metadata producing apparatus comprising: a type information acquiring unit that acquires information relating to the type of metadata necessary to conduct the predetermined processing; and a metadata producing unit that produces, on the basis of the information acquired by the type information acquiring unit, metadata to be correlated with the image data to which the predetermined processing is to be administered.

Further, a metadata producing method pertaining to the present invention is a metadata producing method that produces metadata for correlation with image data to which predetermined processing is to be administered and for characterizing that image data, the metadata producing method comprising: a type information acquiring step that acquires information relating to the type of metadata necessary to conduct the predetermined processing; and a metadata producing step that produces, on the basis of the information acquired by the type information acquiring step, metadata to be correlated with the image data to which the predetermined processing is to be administered.

Further, a metadata producing program pertaining to the present invention is a metadata producing program that causes a computer to execute processing that produces metadata for correlation with image data to which predetermined processing is to be administered and for characterizing that image data, the metadata producing program causing the computer to execute: a type information acquiring step that acquires information relating to the type of metadata necessary to conduct the predetermined processing; and a metadata producing step that produces, on the basis of the information acquired by the type information acquiring step, metadata to be correlated with the image data to which the predetermined processing is to be administered.

DESCRIPTION OF THE DRAWINGS

FIG. 4 are descriptive diagrams of metadata that can be acquired inside the MFP 100 shown in FIG. 1.

DESCRIPTION OF THE EMBODIMENTS

An embodiment of the present invention will be described below with reference to the drawings.

Figure 1:
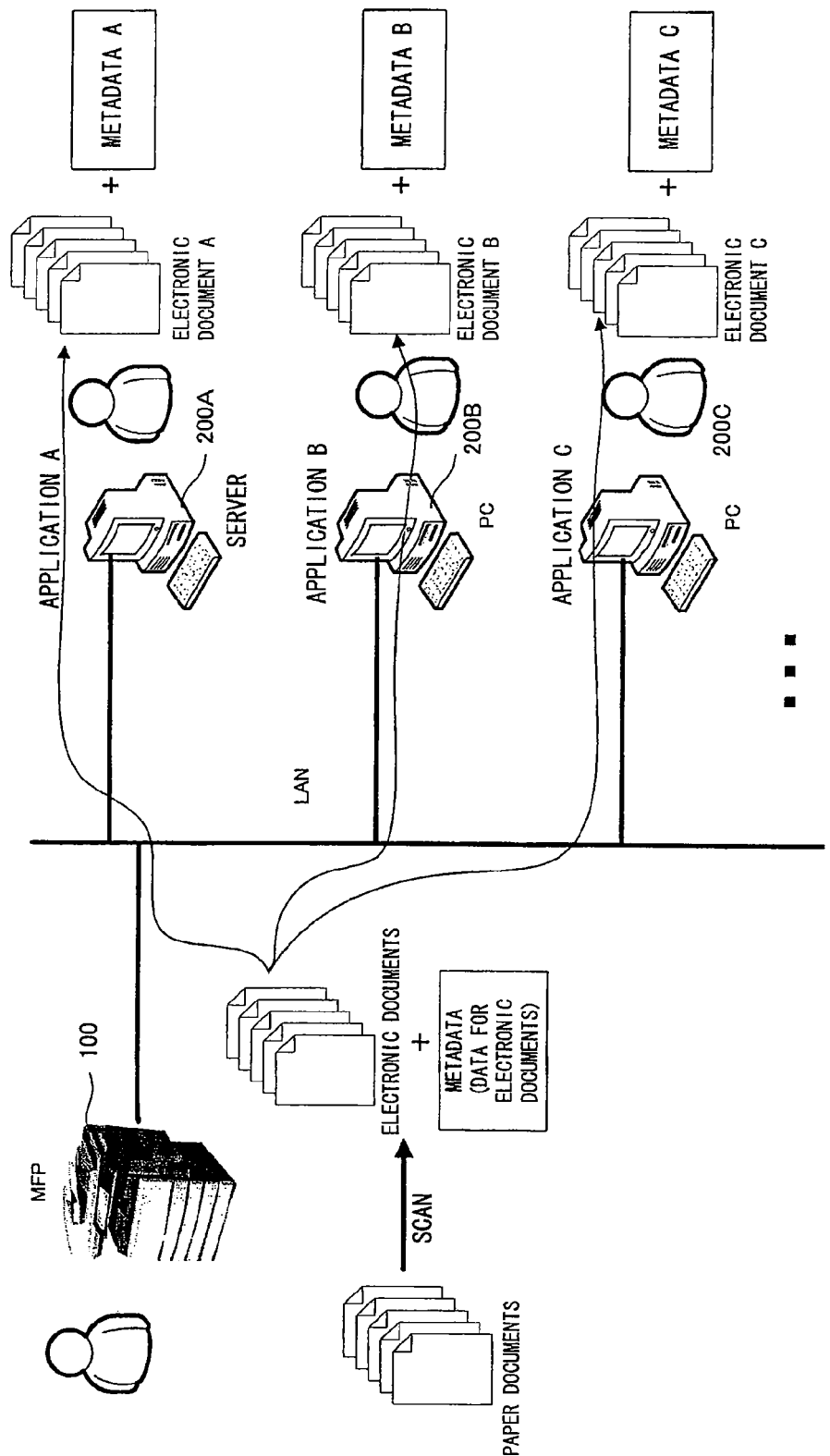
FIG. 1 is a block diagram showing the overall configuration of a metadata producing system according to an embodiment of the invention.

FIG. 1 is a block diagram showing the overall configuration of a system that produces metadata according to the embodiment of the present invention. In FIG. 1, there is a multifunction peripheral (MFP) 100 serving as an image processing apparatus that scans paper documents, produces electronic documents and metadata for characterizing those electronic documents, and transmits the electronic documents and metadata to an unillustrated server and PCs 200A to 200C connected to a network. Here, applications A to C are installed in the server and PCs 200A to 200C. The applications A to C include document management software, for example, and are applications that are individually installed in the server and PCs 200A to 200C. Here, metadata A to C necessary to conduct processing are different in the applications A to C.

Figure 2:
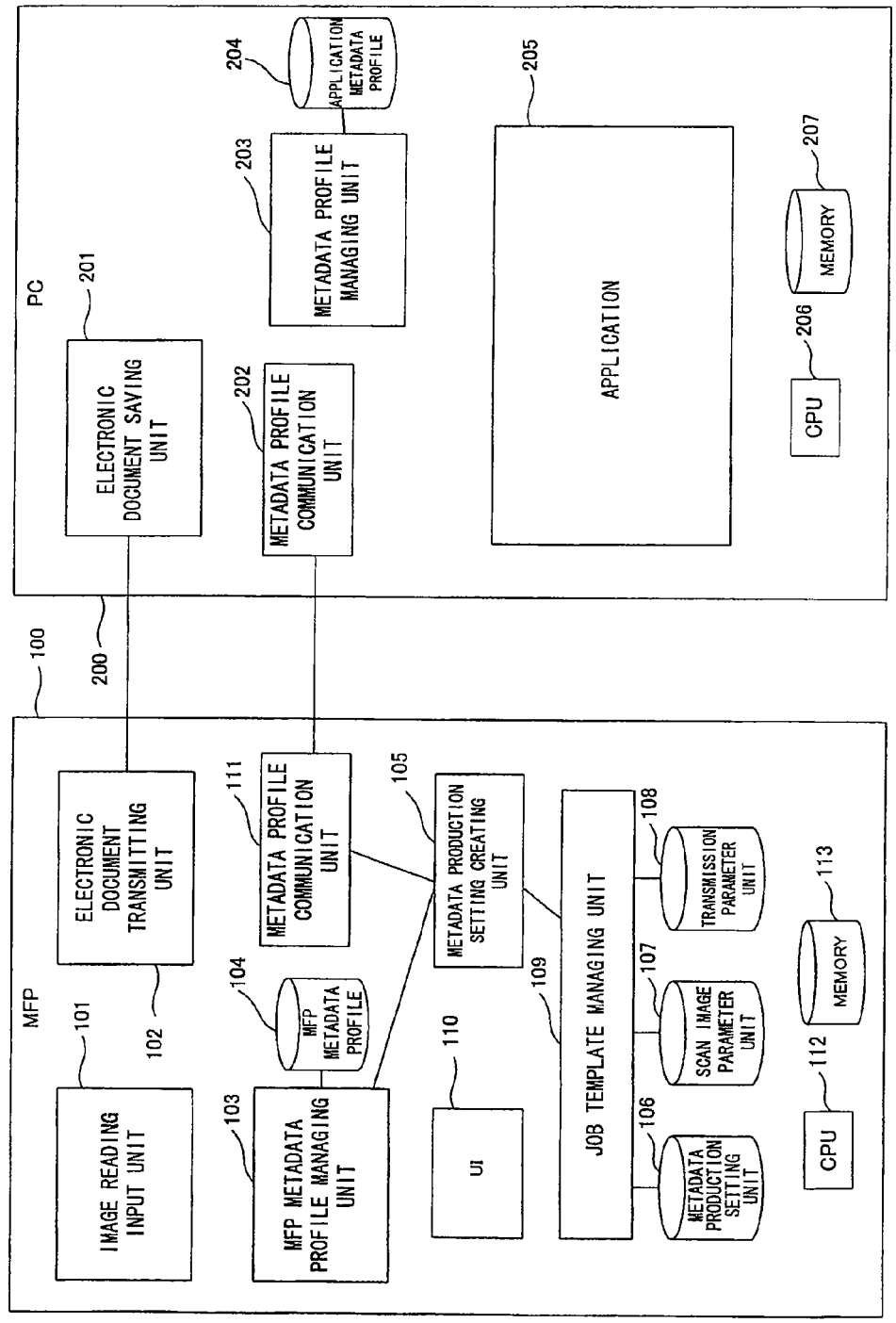
FIG. 2 is a diagram showing the internal configurations of an MFP 100 and a PC 200 shown in FIG. 1.

FIG. 2 is a diagram showing the internal configurations of the MFP 100 and the server and PCs 200A to 200C. The internal configuration of the MFP 100 includes: an image reading input unit (image reading unit, metadata producing unit) 101 that scans paper documents and produces electronic image data files and metadata; an electronic document transmitting unit 102 that transfers the electronic image data files and metadata produced by the image reading input unit 101 to the server and PCs via the network; an MFP metadata profile managing unit 103 and an MFP metadata profile storage unit 104 that manage MFP metadata profiles that are lists of metadata that can be acquired (can be produced) by the MFP; a metadata production setting creating unit 105 that creates lists of metadata actually necessary to the applications; a job template managing unit 109 that manages data of a metadata production setting unit 106, a scan image parameter setting unit 107 and a transmission parameter setting unit 108; a user interface UI 110; a metadata profile communication unit 111; a CPU 112; and a memory 113. The metadata production setting unit 106, the scan image parameter setting unit 107 and the transmission parameter setting unit 108 are configured by databases.

Further, the internal configuration of the PC 200, which generically represents the server and PCs 200A to 200C, includes: an electronic document saving unit 201 that saves the electronic documents transferred from the electronic document transmitting unit 102 inside the MFP 100; a metadata profile communication unit 202 that communicates with the metadata profile communication unit 111 of the MFP 100; a metadata profile managing unit 203 that stores/manages, in an application metadata profile unit 204, the metadata profiles transferred via the metadata profile communication unit 202; an application 205 installed individually; a CPU 206; and a memory 207.

Here, the metadata profile communication units 111 and 202 (type information acquiring units) are portions that communicate and exchange metadata profiles between the MFP 100 and the PC 200. In the present embodiment, two cases will be described. The first is a case where the PC 200 transmits an application metadata profile to the MFP 100, and the second is a case where the MFP 100 transmits an MFP metadata profile to the PC 200.

Further, the metadata production setting creating unit 105 is a portion that creates the lists of metadata actually necessary to the applications. For example, there are cases where there are fewer items in a metadata list created by the metadata production setting creating unit 105 than in an MFP metadata profile managed by the MFP metadata profile managing unit 103.

Further, the job template managing unit (job template setting unit) 109 manages three types of data—metadata production settings, scan image parameter settings, and transmission parameter settings—but the metadata production settings are realized by a metadata list such as shown in later-described FIG. 4 and become a list of metadata list necessary for the application. Further, settings relating to the format in which the metadata is saved (whether the metadata is to be embedded in an image file or saved in a file separate from an image file) are also included in the metadata production settings. Further, the scan image parameter settings are parameters necessary when scanning is executed, and are settings such as resolution, paper size, exposure, rotation, and image format (TIFF, JPEG, PDF). Moreover, the transmission parameter settings are settings when transmitting a produced electronic file to the server and PCs, and are path names of destinations in the server and PCs where the produced electronic file is to be saved.

The CPUs 112 and 206 include the role of conducting various types of processing in the MFP 100 and the PC 200 (or server), and also include the role of realizing various types of functions by executing programs stored in the memories 113 and 207. The memories 113 and 207 are configured by a ROM, a RAM, and the like, for example, and include the role of storing various types of information and programs utilized in the MFP 100 and the PC 200 (or server).

Figure 3B:
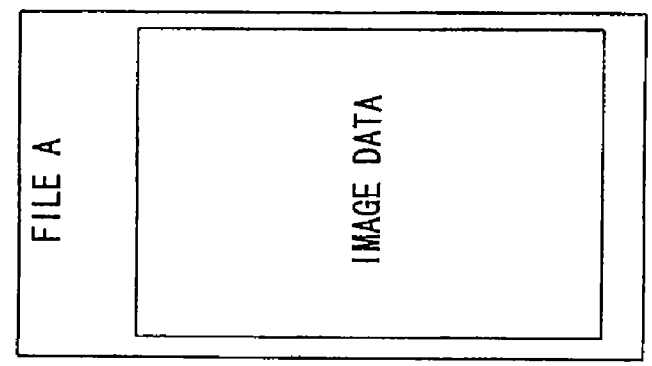
FIG. 3 are diagrams showing the relationship between image data and metadata.
Figure 3A:
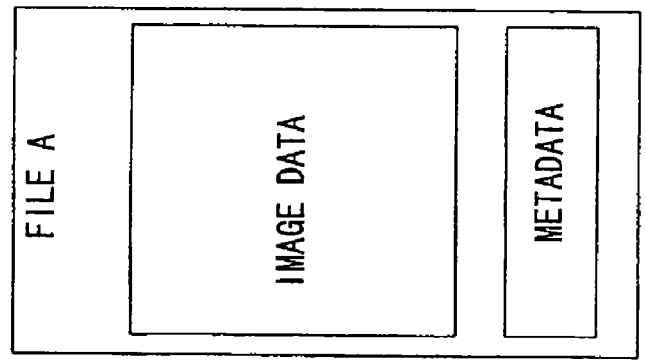

Next, FIG. 3 is a diagram showing the corresponding relationship between image data and metadata. There are two locations where metadata is saved. The first is where the metadata is embedded (incorporated) in an image data file A, as shown in FIG. 3(A), and the second is where the metadata is saved in a file B separate from the image data file A and where both files are correlated, as shown in FIG. 3(B).

Further, FIG. 4 show an example of metadata that can be acquired inside the MFP 100, is stored in the MFP metadata profile storage unit 104, and is managed by the MFP metadata profile managing unit 103. FIG. 4(B) shows an example of metadata of the two labels of "document" and "objects" shown in FIG. 4(A). The "objects" are elements configuring a document, and are constituent elements such as the title, body, figures, and graphs.

Figure 5:
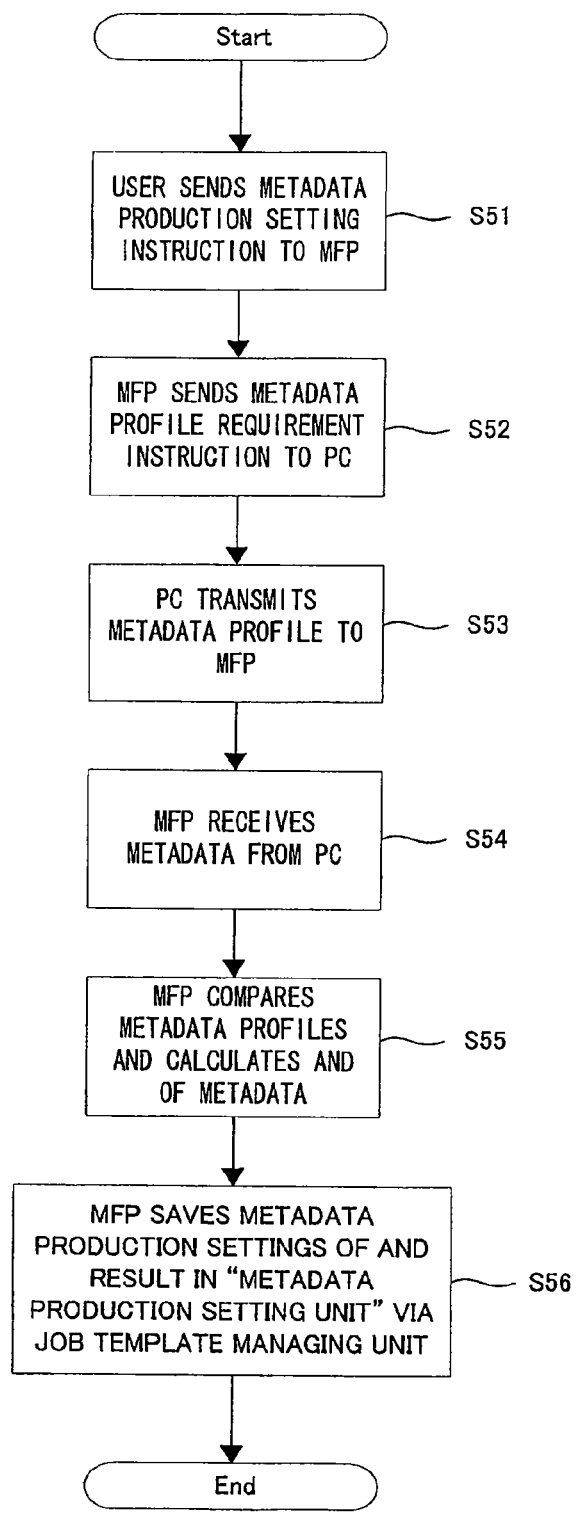
FIG. 5 is a flow chart describing an operation of determining and saving metadata necessary to an application in the metadata producing system pertaining to the embodiment of the invention.
Figure 6:
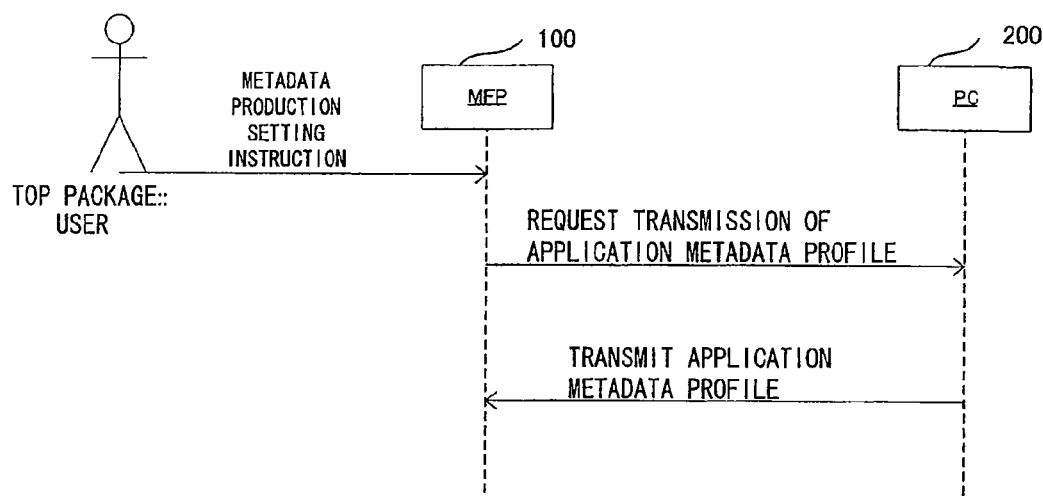
FIG. 6 is a sequence diagram describing the operation of determining and saving metadata necessary to an application in the metadata producing system pertaining to the embodiment of the invention.

Next, an operation of determining and saving metadata necessary to an application in the metadata producing system pertaining to the present embodiment will be described with reference to the flow chart shown in FIG. 5 and the sequence diagram shown in FIG. 6.

First, a user sends a metadata production setting instruction to the MFP 100 from the user interface UI 110, whereby the MFP 100 sends a data profile requirement instruction to the PC 200 through the metadata profile communication unit 111 (steps S51 and S52). On the basis of this, the PC 200 acquires information (metadata profile) relating to the type of metadata that is managed by the metadata profile managing unit 203 and necessary to conduct predetermined processing with an application (type information acquiring step), and uses the metadata profile communication unit 202 to transmit this information to the MFP 100 (step S53).

The MFP 100 receives the metadata profile from the PC 200 through the metadata profile communication unit 111 (step S54).

Next, the metadata production setting creating unit 105 of the MFP 100 compares the MFP metadata profile managed by the MFP metadata profile managing unit 103 and the application metadata profile received from the PC 200, calculates the AND (logical product) of the metadata (step S55), produces a metadata to correlate the metadata production settings of the AND operation result with the image data to which predetermined processing is to be administered via the job template managing unit 109, and saves the metadata in the metadata production setting unit 106 (metadata producing step) (step S56). That is, the metadata production setting creating unit 105 produces, of types of metadata where information is acquired by a type information acquiring unit, a type of metadata that can be produced by a metadata producing apparatus.

Figure 7:
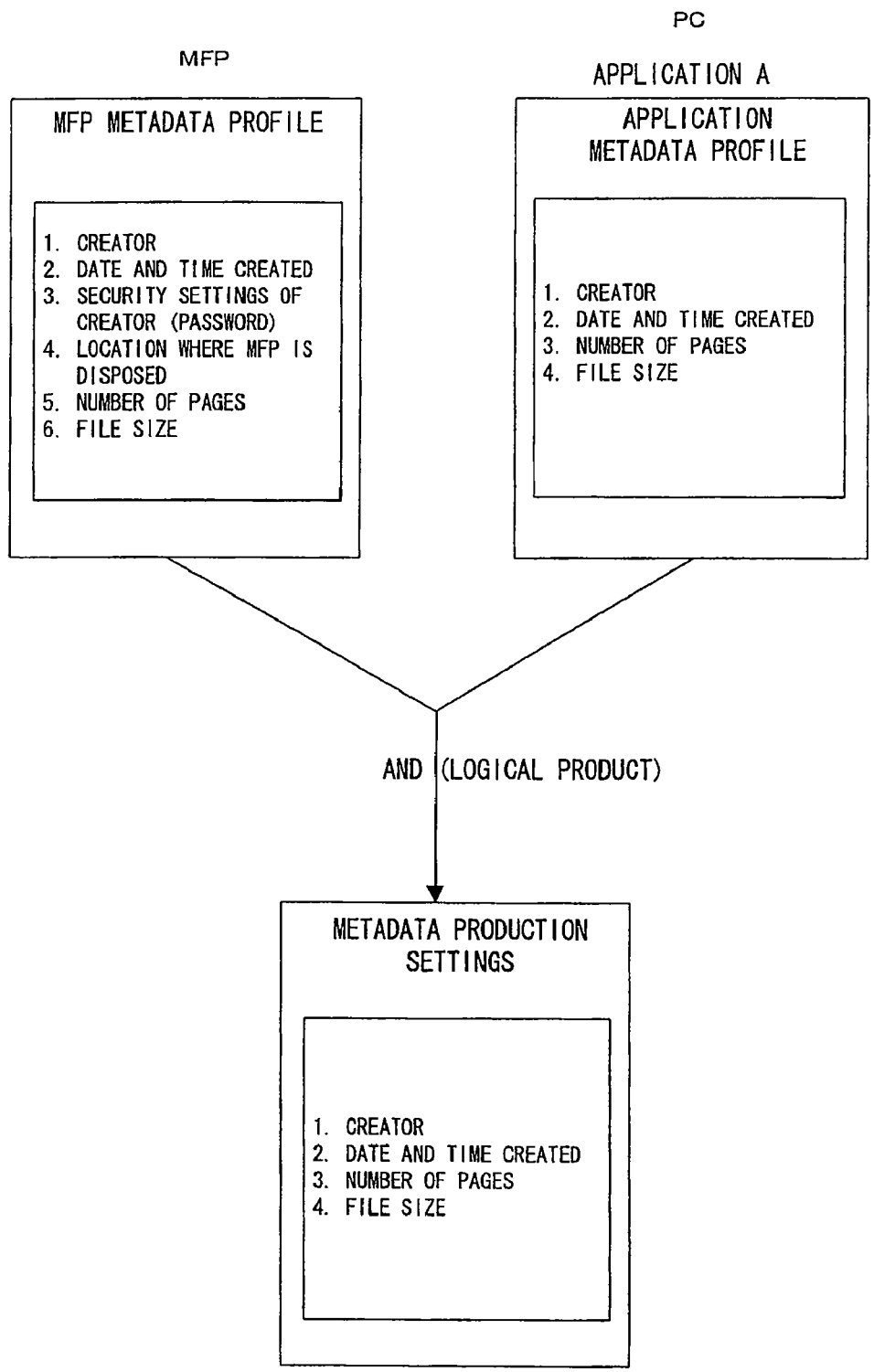
FIG. 7 is a diagram describing an example of the creation of metadata production settings by a metadata production setting creating unit 105 shown in FIG. 1.

FIG. 7 is a diagram for describing an example of the processing by which the metadata production setting creating unit 105 creates the metadata production settings. As shown in FIG. 7, the metadata production setting creating unit 105 compares the MFP metadata profile managed in the MFP metadata profile managing unit 103 and the application metadata profile of application A, for example, received from the PC 200, calculates the AND (logical product) of the metadata, and obtains the creator, creation date and time, number of pages, and file size as the metadata production settings of the AND operation result.

Figure 8:
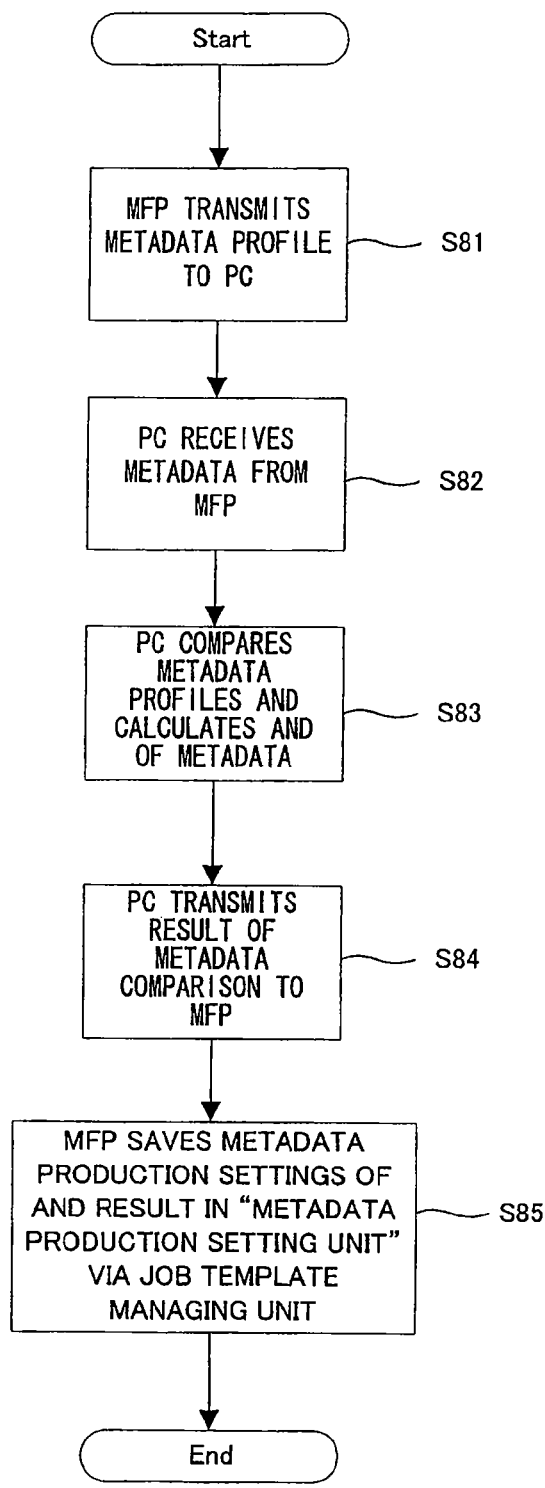
FIG. 8 is a flow chart describing the operation of determining and saving metadata necessary to an application in the metadata producing system pertaining to the embodiment of the invention, where the difference in comparison to the flow chart shown in FIG. 5 is that the location where metadata comparison is conducted has been moved from the MFP 100 to the PC 200.

FIG. 8 shows a flow chart for determination and save of metadata necessary to an application. What is different in the flow chart shown in FIG. 8 in comparison to the flow chart shown in FIG. 5 is that the location where the comparison is conducted between the metadata necessary to the application and the metadata that can be produced by the MFP has been moved from the MFP 100 to the PC 200.

That is, the MFP 100 uses the metadata profile communication unit 111 to transmit to the PC 200 the application metadata profile managed by the metadata profile managing unit 103 (step S81).

The PC 200 receives the metadata profile from the MFP 100 through the metadata profile communication unit 202 (step S82).

Next, the metadata profile managing unit 203 of the PC 200 compares the metadata profiles, calculates the AND (logical product) of the metadata (step S83), and transmits the AND operation result serving as the comparison result to the MFP 100 through the metadata profile communication unit 202 (step S84).

The MFP 100 saves the metadata production settings of the AND result in the metadata production setting unit 106 via the job template managing unit 109 (step S85). It will be noted that the metadata profile may be configured such that it is acquired from a device where applications are executed (here, the PC 200), or such that, on the basis of identification information identifying the application, information relating to the type of metadata correlated with that identification information is acquired from a database or the like.

Figure 9:
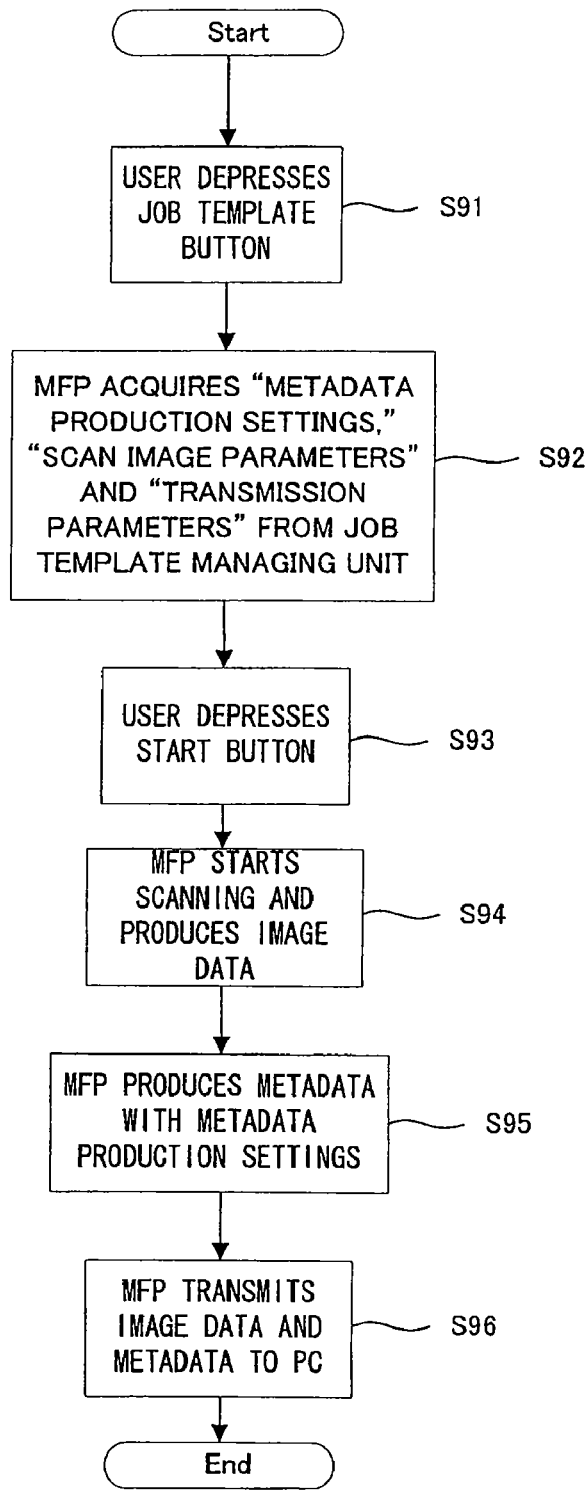
FIG. 9 is a flow chart describing an operation of using a job template to transmit a metadata-attached electronic document in the metadata producing system pertaining to the embodiment of the invention.
Figure 10:
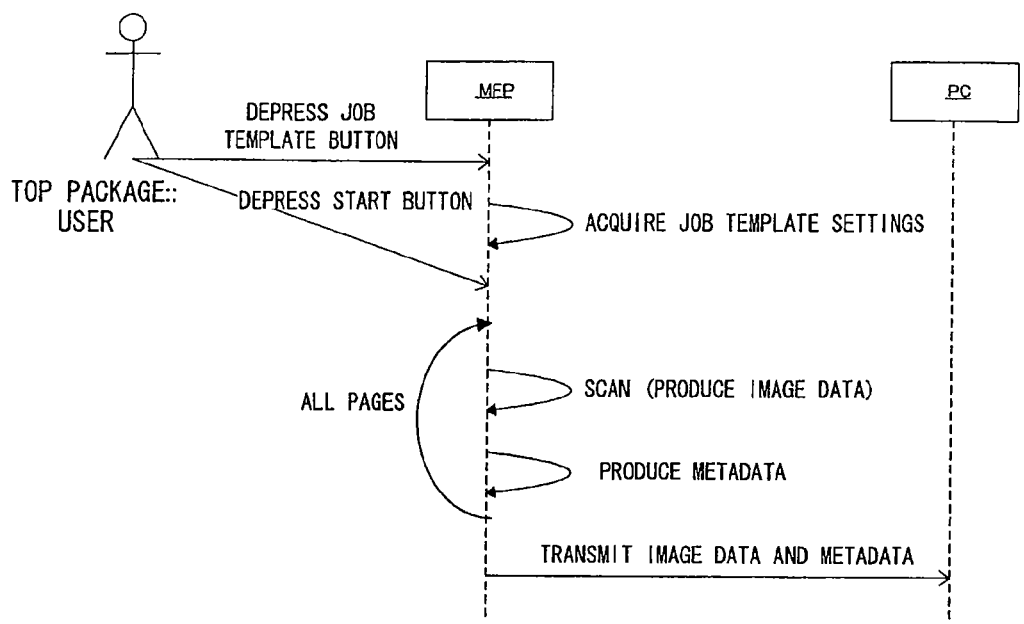
FIG. 10 is a sequence diagram describing the operation of using a job template to transmit a metadata-attached electronic document in the metadata producing system pertaining to the embodiment of the invention.

Next, an operation of using a job template to transmit a metadata-attached electronic document in the metadata producing system pertaining to the present embodiment will be described with reference to the flow chart shown in FIG. 9 and the sequence diagram shown in FIG. 10.

First, the user depresses a job template button from the UI 110 of the MFP 100 (step S91), whereby the metadata production setting creating unit 105 acquires, via the job template managing unit 109, data stored in the metadata production setting unit 106, the scan image parameter unit 107 and the transmission parameter unit 108 set in the job template (step S92).

Next, the user depresses a start button from the UI 110 (step S93), whereby, on the basis of this, the job template managing unit 109 starts scan processing, produces image data (step S94), and produces metadata on the basis of the metadata production settings (step S95). After repeating this until the last page, the MFP 100 transmits the image data and the metadata to the PC 200 (step S96).

Figure 11:
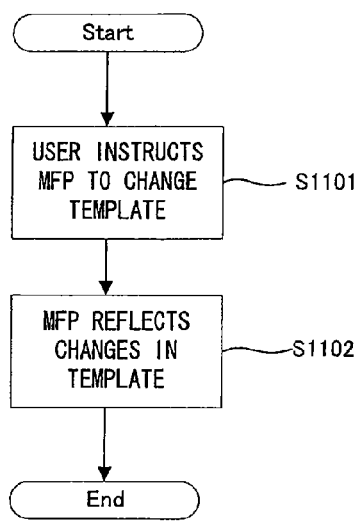
FIG. 11 is a flow chart describing an operation of editing metadata production settings saved in a job template in the metadata producing system pertaining to the embodiment of the invention.
Figure 12:
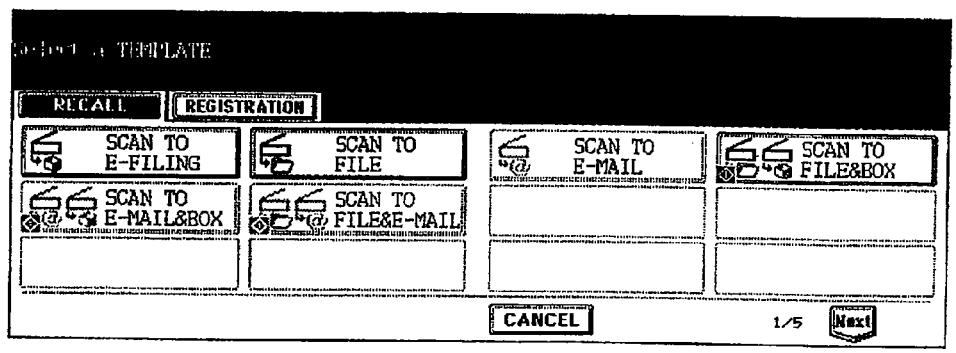
FIG. 12 is a diagram showing an example of a job template setting screen in a metadata producing apparatus according to the embodiment.

Moreover, an operation of editing the metadata production settings saved in a job template in the metadata producing system pertaining to the present embodiment will be described with reference to the flow chart shown in FIG. 11. FIG. 12 is a diagram showing an example of a job template setting screen. In the job template setting screen shown in the same figure, setting buttons in regard to plural kinds of processing conducted by the MFP are disposed, and screens of metadata settings correlated with respect to optional processing can be called up by depressing the setting buttons.

First, the user instructs, from the UI 110, the job template managing unit 109 of the MFP 100 to change the job template (step S1101). Next, the job template managing unit 109 of the MFP 100 reflects the changes in the template settings in accordance with the user's instruction (job template setting step) (step S1102). As shown in FIG. 2, the three categories of "metadata production settings," "scan image parameters" and "transmission parameters" are present in the template settings, and the parameters can be set independently.

Further, by saving metadata settings that are different for each application in the job template, metadata settings can be efficiently managed. This is because address information of transmission destinations and the like is also simultaneously managed in the job template. Further, job settings for transmitting an electronic document to an application can be facilitated, and the operation for starting a job of transmitting an electronic document to an application can be simplified.

Further, the type information acquiring step may be configured such that information relating to the type of metadata necessary to conduct predetermined processing is acquired at a timing when a new job template setting is started by the job template managing unit 109, or such that information relating to the type of metadata necessary to conduct predetermined processing is acquired at a timing when the metadata producing apparatus is started, or such that information relating to the type of metadata necessary to conduct predetermined processing is acquired when the operating rate of the metadata producing apparatus is equal to or less than a predetermined value (e.g., when idling).

Moreover, by having means that edits a job template including metadata production settings, changes in the necessary metadata can be easily accommodated.

Each of the steps in the processing by the MFP 100 and the PC 200 are realized by causing the CPUs 112 and 206 to execute a metadata producing program stored in the memories 113 and 207.

Further, in the present embodiment, description was given in a case where the functions for implementing the invention were prerecorded inside an apparatus, but the invention is not limited to this. The same functions may also be downloaded to an apparatus from a network, or a program where the same functions have been stored in a recording medium may be installed in an apparatus. Any type of recording medium may be used, such as a CD-ROM or the like, as long as it is a recording medium that can store a program and can be read by an apparatus. Further, the functions obtained by installing or downloading in this manner may be realized in cooperation with an operating system (OS) or the like inside an apparatus.

Further, in the preceding embodiment, an example was described where all of the constituent elements configuring the metadata producing apparatus were disposed in the MFP, but the invention is not limited to this. The constituent elements may be disposed in any location as long as communication between the constituent elements configuring the metadata producing apparatus is possible.

The present invention has been described in detail by way of a specific embodiment, but it will be apparent to those skilled in the art that various modifications and improvements can be made without departing from the spirit and scope of the invention.

As described in detail above, according to the present embodiment, technology can be provided which, when producing metadata for correlation with image data to which predetermined processing is to be administered and for characterizing that image data, can produce metadata that is more appropriate to the predetermined processing and can contribute to alleviating the work burden. Further, the burdensomeness of metadata setting can be eliminated by automatically determining the metadata to be provided to a recipient by conducting negotiation with that recipient and reflecting the metadata in the metadata production settings.

What is claimed is:

1. A metadata producing apparatus comprising:
   an image reading unit that reads an image of a document;
   a type information acquiring unit that acquires information relating to the type of metadata necessary to conduct predetermined processing with respect to image data of the document read by the image reading unit;
   a metadata producing unit that produces, on the basis of the information acquired by the type information acquiring unit, metadata to be correlated with the image data to which the predetermined processing is to be administered; and
   a job template setting unit that sets, in a job template and on the basis of the information acquired by the type information acquiring unit, items relating to the metadata to be correlated with the image data.

2. The metadata producing apparatus of claim 1, wherein the type information acquiring unit acquires information relating to the type of metadata necessary to an application that conducts the predetermined processing.

3. The metadata producing apparatus of claim 1, wherein the metadata producing unit produces, on the basis of the job template set by the job template setting unit, the metadata to be correlated with the image data.

4. The metadata producing apparatus of claim 3, wherein the type information acquiring unit acquires, at a timing when a new job template setting is started by the job template setting unit, information relating to the type of metadata necessary to conduct the predetermined processing.

5. The metadata producing apparatus of claim 1, wherein the type information acquiring unit acquires, at a timing when the metadata producing apparatus is started, information relating to the type of metadata necessary to conduct the predetermined processing.

6. The metadata producing apparatus of claim 1, wherein the type information acquiring unit acquires, when the operating rate of the metadata producing apparatus is equal to or less than a predetermined value, information relating to the type of metadata necessary to conduct the predetermined processing.

7. A metadata producing method comprising:
   reading an image of a document;
   acquiring information relating to a type of metadata necessary to conduct predetermined processing with respect to image data;
   producing metadata to be correlated with the image data on the basis of the acquired information; and
   setting items relating to the metadata to be correlated with the image data in a job template on the basis of the acquired information.

8. The metadata producing method of claim 7, wherein the type information acquiring step acquires information relating to the type of metadata necessary to an application that conducts the predetermined processing.

9. The metadata producing method of claim 7, wherein producing the metadata to be correlated with the image data is conducted on the basis of the job template.

10. The metadata producing method of claim 9, wherein the type information acquiring step acquires, at a timing when a new job template setting is started by the job template setting step, information relating to the type of metadata necessary to conduct the predetermined processing.

11. The metadata producing method of claim 7, wherein the type information acquiring step acquires, at a timing when a device executing the metadata producing method is started, information relating to the type of metadata necessary to conduct the predetermined processing.

12. The metadata producing method of claim 7, wherein the type information acquiring step acquires, when the operating rate of a device executing the metadata producing method is equal to or less than a predetermined value, information relating to the type of metadata necessary to conduct the predetermined processing.

13. A non-transitory computer-readable storage medium having stored therein a metadata producing program that causes a computer to execute:

reading an image of a document;

acquiring information relating to a type of metadata necessary to conduct predetermined processing with respect to image data;

producing metadata to be correlated with the image data on the basis of the acquired information; and setting items relating to the metadata to be correlated with the image data in a job template on the basis of the acquired information.

14. The non-transitory computer-readable storage medium of claim 13, wherein the type information acquiring step acquires information relating to the type of metadata necessary to an application that conducts the predetermined processing.

15. The non-transitory computer-readable storage medium of claim 13, wherein the metadata producing step produces, on the basis of the job template set by the job template setting unit, the metadata to be correlated with the image data.

16. The non-transitory computer-readable storage medium of claim 15, wherein the type information acquiring step acquires, at a timing when a new job template setting is started by the job template setting step, information relating to the type of metadata necessary to conduct the predetermined processing.

* * * * *